United States Patent
Zhu et al.

(10) Patent No.: US 9,179,157 B2
(45) Date of Patent: Nov. 3, 2015

(54) HYPOTHETICAL REFERENCE DECODER FOR SCALABLE VIDEO CODING

(75) Inventors: Lihua Zhu, San Jose, CA (US); Jiancong Luo, West Windsor, NJ (US); Peng Yin, Ithaca, NY (US); Cristina Gomila, Princeton, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 233 days.

(21) Appl. No.: 12/448,510

(22) PCT Filed: Dec. 21, 2007

(86) PCT No.: PCT/US2007/026240
§ 371 (c)(1),
(2), (4) Date: Dec. 7, 2009

(87) PCT Pub. No.: WO2008/085433
PCT Pub. Date: Jul. 17, 2008

(65) Prior Publication Data
US 2010/0091837 A1    Apr. 15, 2010

Related U.S. Application Data

(60) Provisional application No. 60/878,729, filed on Jan. 5, 2007.

(51) Int. Cl.
*H04N 7/12*       (2006.01)
*H04N 11/02*     (2006.01)
*H04N 11/04*     (2006.01)
*H04N 19/36*     (2014.01)
*H04N 19/70*     (2014.01)
(Continued)

(52) U.S. Cl.
CPC .............. *H04N 19/36* (2014.11); *H04N 19/30* (2014.11); *H04N 19/31* (2014.11); *H04N 19/61* (2014.11); *H04N 19/70* (2014.11)

(58) Field of Classification Search
None
See application file for complete search history.

(56) References Cited

U.S. PATENT DOCUMENTS

| 5,988,863 | A | 11/1999 | Demos | |
|---|---|---|---|---|
| 2004/0179619 | A1* | 9/2004 | Tian et al. | 375/240.26 |

(Continued)

OTHER PUBLICATIONS

Ma et al.: "Rate Control for JVT Video Coding Scheme with HRD Considerations," IEEE, ICIP 2003, Sep. 14, 2003.

(Continued)

*Primary Examiner* — Joseph Ustaris
*Assistant Examiner* — Kevin McInnish
(74) *Attorney, Agent, or Firm* — Robert D. Shedd; Paul P. Kiel; Xiaoan Lu

(57) ABSTRACT

The present principles relate to a hypothetical reference decoder (HRD) for a Scalable Video Coding extension for a compression algorithm. One such implementation proposes to modify the H.264/AVC HRD for use with the SVC of AVC. That implementation defines HRD constraints for each interoperability point of SVC. One implementation in particular is described, but other implementations are possible and are contemplated by the present principles. The changes for spatial, temporal, and SNR scalability are shown. There are also changes to the related HRD parameters followed that are shown. The several mentioned implementations provide rules for an HRD for SVC. At least one implementation proposes the SVC-HRD rules as modifications to the AVC-HRD rules. A user may use the proposed SVC-HRD rules to build an SVC-HRD and test a bitstream for SVC compliance.

11 Claims, 5 Drawing Sheets

Table 2 Proposed picture timing SEI message

| pic_timing( payloadSize ) { | C | Descriptor |
|---|---|---|
| if( profile_idc == 'SVC' ) { | | |
| ( CpbDpbDelaysPresentFlag ) { | | |
| num_temporal_layers_minus1 | 0 | ue(v) |
| for( j = 0; j <= num_ temporal _layers_minus1; j++ ) { | | |
| temporal_level[i] | 0 | u(3) |
| cpb_removal_delay[i] | 5 | u(v) |
| dpb_output_delay[i] | 5 | u(v) |
| } | | |
| } | | |
| } | | |
| else { | | |
| if( CpbDpbDelaysPresentFlag ) { | | |
| cpb_removal_delay | 5 | u(v) |
| dpb_output_delay | 5 | u(v) |
| } | | |
| } | | |
| ... | | |
| } | | |

(51) Int. Cl.
*H04N 19/30* (2014.01)
*H04N 19/61* (2014.01)
*H04N 19/31* (2014.01)

(56) References Cited

U.S. PATENT DOCUMENTS

| | | | |
|---|---|---|---|
| 2005/0175098 A1* | 8/2005 | Narasimhan et al. | 375/240.12 |
| 2005/0201471 A1* | 9/2005 | Hannuksela et al. | 375/240.25 |
| 2005/0254575 A1* | 11/2005 | Hannuksela et al. | 375/240.1 |
| 2006/0120463 A1* | 6/2006 | Wang | 375/240.25 |
| 2006/0126713 A1 | 6/2006 | Chou et al. | |
| 2006/0165166 A1 | 7/2006 | Chou et al. | |
| 2006/0251169 A1 | 11/2006 | Wang | |
| 2007/0110150 A1* | 5/2007 | Wang et al. | 375/240.1 |

OTHER PUBLICATIONS

Miyaji et al.: "A Novel Rate Control Method for H.264 Video Coding," IEEE, Sep. 11, 2005, 4 pages.
Puri et al.: "Video Coding Using the H.264/MPEG-4 AVC Compression Standard", Signal Processing Image Communication, Elsevier Science Publishers, Amsterdam, NL, vol. 19, No. 9, Oct. 1, 2004, pp. 793-849, XP004607150.
Ribas-Corbera et al.: "A Generalized Hypothetical Reference Decoder for H.26L", ITU Telecommunications Standardization Sector, Doc. VCEG-N58, Sep. 4, 2001, p. 1-15, XP030003308.
Ribas-Corbera et al.: "A Generalized Hypothetical Reference Decoder for H.264/AVC", IEEE Transactions on Circuits and Systems for Video Technology, vol. 13, No. 7, Jul. 1, 2003, pp. 674-687, XP0011099259.
Zhu et al.: "Hypothetical Reference Decoder for SVC,"Joint Video Team of ISO/IEC MPEG & ITU-T VCEG,Doc.: JVT-VXXX, Jan. 13, 2007.
International Search Report, dated Jul. 11, 2008.
Xu et al. Rate Control for Scalable Video Model.
Wiegand et al., "Meeting Report, Draft 7", Joint Video Team (JVT) of ISO/IEC MPEG & ITU-T VCEG, Document: JVT-U200 (draft), 21st Meeting: Hangzhou, China, Oct. 20-27, 2008.
Wang et al., "SVC Hypothetical Reference Decoder (HRD)", Joint Video Team (JVT) of ISO/IEC MPEG & ITU-T VCEG, Document: JVT-U111, 21st Meeting: Hangzhou, China, Oct. 20-27, 2006.
Viscito, "HRD Editor's Input to Final Committee Draft (FCD) of Joint Video Specification (ITU-T Rec. H.264/ISO/IEc 14496-10 AVC) Regarding Hypothetical Reference Decoder", Joint Video Team (JVT) of ISO/IEC MPEG and ITU-T VCEG, Document: JVT-D146, 4th Meeting: Klagenfurt, July, 2002.
Wang et al., "On SVC High-Level Syntax", Joint Video Team (JVT) of ISO/IEC MPEG & ITU-T VCEG, Document: JVT-U109, 21st Meeting: Hangzhou, China, Oct. 20-27, 2006.
Advanced Video Coding for Generic Audiovisual Services, "Series H: Audiovisual and Multimedia Systems, Infrastructure of Audiovisual Services—Coding of Moving Video" ITU-T, H.264, Mar. 2005, pp. 40, 264-266, 277, 311-312.

* cited by examiner

Table 1 Sequence Parameter Set of AVC

| seq_parameter_set_rbsp( ) { | C | Descriptor |
|---|---|---|
| profile_idc | 0 | u(8) |
| ... | | |
| sequence_parameter_set_id | 0 | ue(v) |
| ... | | |
| vui_parameters_present_flag | 0 | u(1) |
| if( vui_parameters_present_flag ) | | |
|    vui_parameters( ) | 0 | |
| rbsp_trailing_bits( ) | 0 | |
| } | | |

FIGURE 1

Table 2 Buffer period SEI message of AVC

| buffering_period( payloadSize ) { | C | Descriptor |
|---|---|---|
| seq_parameter_set_id | 5 | ue(v) |
| ... | | |
| } | | |

FIGURE 2

Table 3 Proposed HRD Parameters

| Hrd_parameters( ) { | C | Descriptor |
|---|---|---|
|   If( profile_idc == 'SVC') { | | |
|     num_layers_minus1 | 0 | ue(v) |
|     for( i = 0; i <= num_layers_minus1; i++){ | | |
|       dependency_id[i] | 0 | u(3) |
|       temporal_level[i] | 0 | u(3) |
|       quality_level[i] | 0 | u(2) |
|     cpb_cnt_minus1[i] | 0 | ue(v) |
|     bit_rate_scale [i] | 0 | u(4) |
|     cpb_size_scale [i] | 0 | u(4) |
|     for( SchedSelIdx = 0; SchedSelIdx <= cpb_cnt_minus1; SchedSelIdx++ ){ | | |
|       bit_rate_value_minus1[i][ SchedSelIdx ] | 0 | ue(v) |
|       cpb_size_value_minus1[i][ SchedSelIdx ] | 0 | ue(v) |
|       cbr_flag[i][ SchedSelIdx ] | 0 | u(1) |
|     } | | |
|     initial_cpb_removal_delay_length_minus1[i] | 0 | u(5) |
|     cpb_removal_delay_length_minus1[i] | 0 | u(5) |
|     dpb_output_delay_length_minus1[i] | 0 | u(5) |
|     time_offset_length[i] | 0 | u(5) |
|   } | | |
| } | | |
| else { | | |
|   cpb_cnt_minus1 | 0 | ue(v) |
|   bit_rate_scale | 0 | u(4) |
|   cpb_size_scale | 0 | u(4) |
|   for( SchedSelIdx = 0; SchedSelIdx <= cpb_cnt_minus1; SchedSelIdx++ ) { | | |
|     bit_rate_value_minus1[ SchedSelIdx ] | 0 | ue(v) |
|     cpb_size_value_minus1[ SchedSelIdx ] | 0 | ue(v) |
|     cbr_flag[ SchedSelIdx ] | 0 | u(1) |
|   } | | |
|   initial_cpb_removal_delay_length_minus1 | 0 | u(5) |
|   cpb_removal_delay_length_minus1 | 0 | u(5) |
|   dpb_output_delay_length_minus1 | 0 | u(5) |
|   time_offset_length | 0 | u(5) |

FIGURE 3

Table 4 Proposed VUI parameters

| vui_parameters( ) { | C | Descriptor |
|---|---|---|
| ... | | |
| if( profile_idc == 'SVC') { | | |
|   num_temporal_layers_minus1 | 0 | ue(v) |
|   for( i = 0; i <= num_ temporal _layers_minus1; i++ ) { | | |
|     timing_info_present_flag[i] | 0 | u(1) |
|     if( timing_info_present_flag[i] ) { | | |
|       num_units_in_tick[i] | 0 | u(32) |
|       time_scale[i] | 0 | u(32) |
|       fixed_frame_rate_flag[i] | 0 | u(1) |
|     } | | |
|   } | | |
| } | | |
| else{ | | |
|   timing_info_present_flag | 0 | u(1) |
|   if( timing_info_present_flag ) { | | |
|     num_units_in_tick | 0 | u(32) |
|     time_scale | 0 | u(32) |
|     fixed_frame_rate_flag | 0 | u(1) |
|   } | | |
| } | | |
| ... | | |
| } | | |

FIGURE 4

Table 1 Proposed buffer_period SEI message

| buffering_period( payloadSize ) { | C | Descriptor |
|---|---|---|
|   seq_parameter_set_id | 5 | ue(v) |
|   if ( profile_idc == 'SVC') { | | |
|     num_layers_minus1 | 0 | ue(v) |
|     for( i = 0; I <= num _layers_minus1; i++){ | | |
|       dependency_id[i] | 0 | u(3) |
|       temporal_level[i] | 0 | u(3) |
|       quality_level[i] | 0 | u(2) |
|       if( NalHrdBpPresentFlag ) { | | |
|         for( SchedSelIdx = 0; SchedSelIdx <= cpb_cnt_minus1[i]; SchedSelIdx++ ) { | | |
|           initial_cpb_removal_delay[i][ SchedSelIdx ] | 5 | u(v) |
|           initial_cpb_removal_delay_offset[i][ SchedSelIdx ] | 5 | u(v) |
|         } | | |
|       } | | |
|       if( VclHrdBpPresentFlag ) { | | |
|         for( SchedSelIdx = 0; SchedSelIdx <= cpb_cnt_minus1; SchedSelIdx++ ) { | | |
|           initial_cpb_removal_delay[i][ SchedSelIdx ] | 5 | u(v) |
|           initial_cpb_removal_delay_offset[i][ SchedSelIdx ] | 5 | u(v) |
|         } | | |
|       } | | |
|     } | | |
|   } | | |
|   else { | | |
|   if( NalHrdBpPresentFlag ) { | | |
|     for( SchedSelIdx = 0; SchedSelIdx <= cpb_cnt_minus1; SchedSelIdx++ ) { | | |
|       initial_cpb_removal_delay[ SchedSelIdx ] | 5 | u(v) |
|       initial_cpb_removal_delay_offset[ SchedSelIdx ] | 5 | u(v) |
|     } | | |
|   } | | |
|   if( VclHrdBpPresentFlag ) { | | |
|     for( SchedSelIdx = 0; SchedSelIdx <= cpb_cnt_minus1; SchedSelIdx++ ) { | | |
|       initial_cpb_removal_delay[ SchedSelIdx ] | 5 | u(v) |
|       initial_cpb_removal_delay_offset[ SchedSelIdx ] | 5 | u(v) |
|     } | | |
|   } | | |
|   } | | |
| } | | |

FIGURE 5

Table 2 Proposed picture timing SEI message

| pic_timing( payloadSize ) { | C | Descriptor |
|---|---|---|
| if( profile_idc == 'SVC') { | | |
| ( CpbDpbDelaysPresentFlag ) { | | |
| num_temporal_layers_minus1 | 0 | ue(v) |
| for( j = 0; j <= num_ temporal _layers_minus1; j++ ) { | | |
| temporal_level[i] | 0 | u(3) |
| cpb_removal_delay[i] | 5 | u(v) |
| dpb_output_delay[i] | 5 | u(v) |
| } | | |
| } | | |
| } | | |
| else { | | |
| if( CpbDpbDelaysPresentFlag ) { | | |
| cpb_removal_delay | 5 | u(v) |
| dpb_output_delay | 5 | u(v) |
| } | | |
| } | | |
| ... | | |
| } | | |

HYPOTHETICAL REFERENCE DECODER FOR SCALABLE VIDEO CODING

CROSS-REFERENCE TO RELATED APPLICATIONS

This application is a National Stage Application and claims the benefit, under 35 U.S.C. §365 of International Application PCT/US2007/026240 filed Dec. 21, 2007, which was published in accordance with PCT Article 21(2) on Jul. 17, 2008 in English, and which claims the benefit of U.S. Provisional Patent Application No. 60/878,729 filed on Jan. 5, 2007.

TECHNICAL FIELD

This application relates to a hypothetical reference decoder for Scalable Video Coding in compressed video systems.

BACKGROUND

A hypothetical reference decoder is valuable in compressed video systems because it serves to validate an encoded bitstream for compliance to a standard. In a coding standard such as H.264/AVC, there are numerous interoperability points due to the Scalable Video Coding features of the standard. The H.264/AVC standard has rules (also referred to as requirements, constraints, or operational specifications) defining an HRD. The HRD behavior is normative. Any AVC bitstream has to be compliant to the HRD built according to the rules. SVC (scalable video coding) is an extension (Annex G) to the AVC standard. An SVC bitstream typically has multiple interoperability points (also referred to as operation points), due at least in part to the fact that the bitstream is scalable. Such a bitstream may be scalable spatially, temporally, and in SNR, for example. Sub-bitstreams, corresponding to the scalable aspects, may be extracted from the bitstream. Previous HRDs do not have sufficient rules to allow them to validate bitstreams like those of the SVC in AVC.

SUMMARY

This disclosure describes at least one implementation that provides a hypothetical reference decoder (HRD) for SVC. One such implementation proposes to modify the H.264/AVC HRD for use with SVC. That implementation defines HRD constraints for each interoperability point of SVC. One implementation in particular is described, but other implementations are possible and are contemplated by this disclosure. The first part of the disclosure discusses changes for spatial, temporal, and SNR scalability, respectively. The second part of the disclosure discusses changes to the related HRD parameters followed by the specification text.

The H.264/AVC standard has rules (also referred to as requirements, constraints, or operational specifications) defining an HRD. The HRD behavior is normative. Any AVC bitstream has to be compliant to the HRD built according to the rules. SVC (scalable video coding) is an extension (Annex G) to the AVC standard. This disclosure describes one or more implementations that provide rules for an HRD for SVC. At least one implementation proposes the SVC-HRD rules as modifications to the AVC-HRD rules. A user may use the proposed SVC-HRD rules to build an SVC-HRD and test a bitstream for SVC compliance.

BRIEF DESCRIPTION OF THE DRAWINGS

FIG. 1 shows the sequence parameter set of AVC sequences.

FIG. 2 shows the buffer period SEI message of AVC.
FIG. 3 shows the proposed HRD parameters.
FIG. 4 shows the proposed VUI parameters.
FIG. 5 shows the proposed buffer_period SEI message.
FIG. 6 shows the proposed picture timing SEI message.

DETAILED DESCRIPTION

An SVC bitstream typically has multiple interoperability points (also referred to as operation points), due at least in part to the fact that the bitstream is scalable. Such a bitstream may be scalable spatially, temporally, and in SNR, for example. Sub-bitstreams, corresponding to the scalable aspects, may be extracted from the bitstream. In one implementation, each interoperability point is checked by the HRD to ensure SVC compliance. An HRD may define HRD constraints for each checking point separately. Or several checking points may obey one HRD constraint. In at least one implementation described in this disclosure, separate HRD constraints are proposed for each checking point. The use of separate HRD constraints may ease the operation, and also may provide some similarities to the approach of H.263+.

In this part, in the context of one particular implementation, we shall analyze whether and what to modify from the HRD in H.264/AVC to satisfy the HRD in SVC from spatial, SNR and temporal Scalability, respectively. This presents a description from one conceptual viewpoint of examining various of the many possible types of scalability, and other conceptual viewpoints are also possible.

1. Spatial SVC
   1.1 HRD in the VUI message: VUI message is included in the SPS (see vui_parameters( ) in Table 1). For each spatial SVC layer, since the picture size is different from other layers, its corresponding SPS is different from other layers'. So the HRD of VUI in AVC, without modification, can be directly applied to HRD of VUI for spatial SVC. For each checking point, we can get the correct VUI message through the HRD rules for AVC, as shown in Table 1.
   1.2 Buffer period SEI message: seq_parameter_set_id is in the buffer period SEI message. By indexing seq_parameter_set_id in the SPS which corresponds to each spatial SVC layer, the buffer period for each spatial SVC layer can be obtained. So, for spatial SVC, the buffer period SEI message of HRD in AVC can be directly applied for spatial SVC. For each checking point, we can get correct buffer period SEI message without modifying the current HRD, as shown in Table 2.
   1.3 Picture timing SEI message: cpb_removal_delay and dpb_output_delay could be the same for different layers in the same access unit (see Table 6). So no change is needed for spatial scalability.
2. SNR SVC
   2.1 VUI message: For SNR SVC, the quality layer can be indicated by dependency_id or quality_level. Different quality layers/levels can share the same SPS, so the VUI message in AVC should be modified (see Table 3) to include HRD information for all quality layers/levels.
   2.2 Buffer period SEI message: For SNR SVC, different quality layers/levels can share the same SPS, so it has no one-to-one mapping with seq_parameter_set_id existing in the buffer period SEI message. The buffer period SEI message should be modified (see Table 5) to include HRD information for all quality layers/levels.
   2.3 Picture timing SEI message: cpb_removal_delay and dpb_output_delay could be the same for different quality layers/levels in the same access unit. So no change is needed for spatial scalability.

3. Temporal SVC 3.1 VUI message: For temporal SVC, different temporal layers can share the same SPS, so the VUI message in AVC should be modified (see Table 3) to include HRD information for all temporal layers.

3.2 Buffer period SEI message: For temporal SVC, different temporal layers can share the same SPS, so it has no one-to-one mapping with seq_parameter_set_id existing in the buffer period SEI message. The buffer period SEI message should be modified (see Table 5) to include HRD information for all temporal layers.

3.3 Picture timing SEI message: For temporal SVC, frame rate is different for each temporal layer. Since a lower temporal layer can serve as dependent layer for the higher temporal layer, which means one NAL unit with given temporal_level may work for several frame rates. The picture timing SEI message should be modified (see Table 6) to include HRD information for all temporal layers.

3.4 In the VUI message, when timing_info_present_flag is true, we should consider to modify num_units_in_tick, time_scale and fixed_frame_rate_flag to reflect correct frame rate information (see Table 4).

All three conceptual levels of scalability (spatial, temporal, and SNR) are combined in the following modifications to the AVC-HRD rules. Tables 3-6 are taken from the AVC standard, and relate to the AVC-HRD. The additions to the AVC standard Tables are shown using italics. There are no deletions from the AVC standard Tables, although other implementations may have deletions. The bolded terms are the syntax that are actually sent in the bitstreams. As can be seen, each of Tables 3-6 shows that the AVC standard has been modified by introducing an "if-then" loop that tests the variable "profile_idc". If "profile_idc" is equal to "SVC", then an if-loop if performed one or more times to test one or more points. If "profile_idc" is not equal to "SVC", then "AVC" is presumed to be the relevant standard, and an "else" loop is executed to test one point for AVC compliance (using existing AVC-HRD rules). In Table 3, the variables "dependency_id[i]", "temporal_level[i]", and "quality_level[i]" provide the various scalable options. Because these variables have a combined length of eight bits, there can be up to 2**8 checking points for an SVC bitstream. The implementation is able to loop from 0 to 255 using the eight bits. This compares to a single checking point for an AVC bitstream.

1. In VUI message, HRD parameters are signaled for each dependency layer, temporal layer and quality layer which shares the same SPS, as shown in Table 3. When timing_info_present_flag is true, num_units_in_tick, time_scale and fixed_frame_rate_flag are signaled for each temporal layer, as shown in Table 4.

2. In Buffer period SEI message, HRD related parameters are signaled for each dependency layer, temporal layer and quality layer which shares the same sequence_parameter_set_id, as shown in Table 5.

3. In picture timing SEI message, HRD related parameters are signaled for each temporal layer, as shown in Table 6.

The operation of Tables 3-6 can be summarized. Table 3 defines bit rate and cpb (coded picture buffer) size for each checking point/layer. Table 4 defines frame rate for each temporal layer. Table 5 defines initial cpb delay and initial dpb delay for each checking point/layer. Table 6 defines cpb remove delay and dpb (decoded picture buffer) output delay for each checking point/layer. For each checking point/layer, the above parameters are used in the HRD rules, the same as is done for AVC, to test if the bitstream is compliant.

num_layer_minus1 plus 1 indicates the number of scalable layers or presentation points supported by the bitstream referring to the same seq_parameter_set_id in the SPS which contains this hrd_parameters( ).

dependency_id [i] indicates the dependency (CGS) layer of scalable layer i. It is equal to the dependency_id of the NAL units in the scalable layer i.

temporal_level[i] indicates the temporal layer of scalable layer i. It is equal to the temporal_level of the NAL units in the scalable layer i.

quality_level[i] indicates the quality layer of scalable layer i. It is equal to the quality_level of the NAL units in the scalable layer i.

cpb_cnt_minus1[i], bit_rate_scale [i], cpb_size_scale [i], bit_rate_value_minus1[i][SchedSelIdx], cpb_size_value_minus1[i][SchedSelIdx], cbr_flag[i][SchedSelIdx], initial_cpb_removal_delay_length_minus1[i], cpb_removal_delay_length_minus1[i], dpb_output_delay_length_minus1[i], time_offset_length[i] are equal to their corresponding value for the scalable layer i, respectively.[1]

[1] In the definition, bit rate includes the bits for scalable layer i and its dependent layers.

num_temporal_layer_minus1 plus 1 indicates the number of temporal layers supported by the bitstream. It is equal to the maximal temporal_level of the NAL units in the bitstream.

timing_info_present_flag[i], num_units_in_tick[i], time_scale[i], fixed_frame_rate_flag[i] are equal to their corresponding value for the temporal layer i, respectively.

num_layer_minus1 plus 1 indicates the number of scalable layers or presentation points supported by the bitstream referring to the same seq_parameter_set_id in the buffer_period SEI message.

dependency_id[i] indicates the dependency (CGS) layer of scalable layer i. It is equal to the dependency_id of the NAL units in the scalable layer i.

temporal_level[i] indicates the temporal layer of scalable layer i. It is equal to the temporal_level of the NAL units in the scalable layer i.

quality_level[i] indicates the quality layer of scalable layer i. It is equal to the quality_level of the NAL units in the scalable layer i.

initial_cpb_removal_delay[i][SchedSelIdx], initial_cpb_removal_delay_offset[i][SchedSelIdx] are equal to their corresponding value for the scalable layer i, respectively.

num_temporal_layer_minus1 plus 1 indicates the number of temporal layers which depends on the NAL unit whose access unit associated with this picture timing SEI message.

temporal_layer[i] indicates the temporal level of temporal layer i.

cpb_removal_delay[i], dpb_output_delay[i] are equal to their corresponding value for the temporal layer i, respectively.

Various implementations are contemplated by this disclosure, and the implementations may include one or more of the features described in this disclosure. Such implementations may be in the form of a method, an apparatus, or a program of instructions, for example, and may be implemented using hardware, software, or a combination, for example. Several of the possible implementations follow:

The invention claimed is:

1. A method for implementation of a hypothetical reference decoder (HRD) for scalable video coding (SVC), comprising:
   determining values of variables included in a bit stream indicating a dependency layer, temporal layer, and quality layer of a scalable layer i, i being an integer; and determining HRD parameters corresponding to said scalable layer i, the determined HRD parameters including at least one bit rate parameter, wherein the bit rate parameter is determined based on bits for the scalable layer i and its dependent layers, wherein the determined HRD parameters further include initial coded picture buffer (CPB) removal delay, initial coded picture buffer removal delay offset, CPB removal delay, and decoded picture buffer (DPB) output delay, wherein the determining HRD parameters comprises:

determining the CPB removal delay and the DPB output delay by using explicitly signaled parameters from a picture timing SEI message in the bit stream for each temporal layer, wherein the picture timing SEI message also indicates the number of temporal layers in the bit stream, and determining the CPB removal delay and the DPB output delay to be the same for scalable layers corresponding to different spatial layers or quality layers at each temporal layer.

2. The method of claim 1, in which there are multiple interoperability points in the bit stream, and the multiple interoperability points exhibit scalability with respect to each other.

3. The method of claim 2, in which the exhibited scalability includes one or more of spatial scalability, temporal scalability, and SNR scalability.

4. The method of claim 1 which is defined by a set of rules for creating the hypothetical reference decoder.

5. The method of claim 1, wherein values of the CPB removal delay and DPB output delay are kept same for scalable layers corresponding to different spatial layers and quality layers at each temporal layer, and wherein the values of the CPB removal delay and DPB output delay are different for each temporal layer.

6. A method for scalable video coding, comprising:
determining values of variables indicating a dependency layer, temporal layer, and quality layer of a scalable layer i, i being an integer;
determining hypothetical reference decoder (HRD) parameters corresponding to said scalable layer i, the determined HRD parameters including at least one bit rate parameter, wherein the bit rate parameter is determined based on bits for the scalable layer i and its dependent layers, wherein the determined HRD parameters further include initial coded picture buffer (CPB) removal delay, initial coded picture buffer removal delay offset, CPB removal delay, and decoded picture buffer (DPB) output delay; and
generating a bit stream including the determined values of variables and determined HRD parameters, wherein the CPB removal delay and the DPB output delay are only explicitly signaled in a picture timing SEI message in the bit stream for each temporal layer, the picture timing SEI message also indicating the number of temporal layers in the bit stream, and
wherein the CPB removal delay and the DPB output delay are determined to be the same for scalable layers corresponding to different spatial layers or quality layers at each temporal layer.

7. The method of claim 6, in which there are multiple interoperability points in the bit stream, and the multiple interoperability points exhibit scalability with respect to each other.

8. The method of claim 7, in which the exhibited scalability includes one or more of spatial scalability, temporal scalability, and SNR scalability.

9. The method of claim 6, wherein values of the CPB removal delay and the DPB output delay are kept same for scalable layers corresponding to different spatial layers and quality layers at each temporal layer, and wherein the values of the CPB removal delay and the DPB output delay are different for each temporal layer.

10. A non-transitory storage medium having stored thereon instructions for causing one or more processors to perform:
determining values of variables included in a bit stream indicating a dependency layer, temporal layer, and quality layer of a scalable layer i, i being an integer; and
determining hypothetical reference decoder (HRD) parameters corresponding to said scalable layer i, the determined HRD parameters including at least one bit rate parameter, wherein the bit rate parameter is determined based on bits for the scalable layer i and its dependent layers, wherein the determined HRD parameters further include initial coded picture buffer (CPB) removal delay, initial coded picture buffer removal delay offset, CPB removal delay, and decoded picture buffer (DPB) output delay, wherein the determining HRD parameters comprises:
determining the CPB removal delay and the DPB output delay by using explicitly signaled parameters from a picture timing SEI message in the bit stream for each temporal layer, wherein the picture timing SEI message also indicates the number of temporal layers in the bit stream, and
determining the CPB removal delay and the DPB output delay to be the same for scalable layers corresponding to different spatial layers or quality layers at each temporal layer.

11. A non-transitory storage medium having stored thereon instructions for causing one or more processors to perform:
determining values of variables indicating a dependency layer, temporal layer, and quality layer of a scalable layer i, i being an integer;
determining hypothetical reference decoder (HRD) parameters corresponding to said scalable layer i, the determined HRD parameters including at least one bit rate parameter, wherein the bit rate parameter is determined based on bits for the scalable layer i and its dependent layers, wherein the determined HRD parameters further include initial coded picture buffer (CPB) removal delay, initial coded picture buffer removal delay offset, CPB removal delay, and decoded picture buffer (DPB) output delay; and
generating a bit stream including the determined values of variables and determined HRD parameters, wherein the CPB removal delay and the DPB output delay are only explicitly signaled in a picture timing SEI message in the bit stream for each temporal layer, the picture timing SEI message also indicating the number of temporal layers in the bit stream, and
wherein the CPB removal delay and the DPB output delay are determined to be the same for scalable layers corresponding to different spatial layers or quality layers at each temporal layer.

* * * * *